Oct. 19, 1948.　　　F. C. LORNITZO ET AL　　　2,451,845
PRESSING MACHINE AND MULTIPLE LEVER LINKAGE
MECHANISM FOR TRANSMITTING AND TRANSFORMING
FORCE FOR USE THEREIN
Filed Oct. 20, 1941　　　　　　　　　　　　6 Sheets-Sheet 1

Fig. 1.

Inventors
Frank C. Lornitzo
Herbert G. Beede
By Thomas A. Jenks
Attorney

Patented Oct. 19, 1948

2,451,845

UNITED STATES PATENT OFFICE 2,451,845

PRESSING MACHINE AND MULTIPLE LEVER LINKAGE MECHANISM FOR TRANSMITTING AND TRANSFORMING FORCE FOR USE THEREIN

Frank C. Lornitzo and Herbert G. Beede, Pawtucket, R. I., assignors, by mesne assignments, to Pantex Manufacturing Corporation, a corporation of Delaware Application October 20, 1941, Serial No. 415,778

2 Claims. (Cl. 38—41)

Our invention relates to improvements in garment pressing machines and particularly mechanisms for transmitting and transforming force comprising levers and links for use in transmitting and transforming the input force applied thereto to the output force supplied thereby to the pressing head.

This application comprises the carrying forward of the broad idea shown in the application for patent of Frank C. Lornitzo for Pressing machines and linkage mechanism for transmitting and transforming force for use therein, Ser. No. 415,600, filed October 18, 1941, one of the joint inventors herein. This application comprises specific embodiments of the broad idea shown and claimed in said application with the inherent advantages of applying it to a double or multiple lever system, the specific embodiments of the double lever linkage mechanism shown herein being conceived and developed jointly by said Frank C. Lornitzo and Herbert C. Beede, the joint inventors herein. Among the advantages of a multiple lever system, in place of the single floating lever system shown in said application of Lornitzo, is largely the elimination of side thrust, a minimum amount of which is always inherent in a floating lever system. Another advantage is that the lever systems can be made to work with each of two levers functioning nearer to right angles with each other to effect a greater leverage per unit volume of power cylinder than is possible with a single floating lever system. A further advantage resides in the fact that each lever may function as a guide for the other and eliminate some of the links thought necessary in a single floating lever system, inasmuch as the links themselves may be made transmutable from guide links to power transmitting links on the respective changes of respective leverage characteristics as the effective leverage changes from one lever to the other.

Inasmuch, however, as the application of the broad idea shown and claimed in said application aforesaid shown in this application embodies all of the advantages thereof, at the risk of repetition, so that the invention shown and claimed in this application may be more clearly understood, the advantages set forth in said application are repeated immediately below.

We are aware that any number of combinations of levers and linkages have been used in the prior art, but so far as we are aware, these have been subject to the following disadvantages: Inasmuch as the piston moves outwardly in the cylinder to supply the power in a power press, exerting a substantially even force, if its force were transmitted directly to the pressing head, it is apparent the pressing head would move with even accelerated velocity up to the point of contact with the buck, the impact of the pressing members at this high velocity resulting in a sharp shock; inasmuch as in prior art linkage systems with single point connections the relative force acting on the pressing head would not only remain constant but would tend to increase during the closing movement of the pressing head, the impact of the pressing head would be even greater. To overcome the shock at the instant of contact of the pressing head with the pressing buck, various types of leverage mechanisms have been devised, and various types of braking mechanisms or cushioning devices to control the velocity, force and movement of the pressing head as it strikes the buck have been devised. These have tended to increase the time required for the pressing head in its downward movement to close the press, resulting in slowness of operation of the press during its closing period.

A further disadvantage of the prior art linkage systems with single point connections is due to the continuous change or increase of the relative force or multiplication factor of leverage of the linkage system during the pressing period resulting in unstable pressing conditions during the pressing period and making determination of the actual pressure at the end of the pressure stroke impossible and the actual pressure obtained dependent upon the compression qualities of the padded buck surface.

Another disadvantage of the prior art linkage systems with single point connections arising out of the instability of the power multiplication factor of the mechanism during the pressure stroke is the necessity for very frequent readjustments of the spacing between the pressing head and the buck to make up for the loss of thickness of the buck pad during its continuous use, resulting in loss of pressure unless frequent readjustments of the spacing between the pressing head and buck are made.

A further disadvantage of the prior art single point connection linkages resides in the fact that speed regulating mechanisms, such as dash pots, brakes, throttling of the fluid supply, etc., must be employed to absorb the excessive power used in the press closing period, to prevent the pressing head from obtaining too high a velocity at the moment of contact to prevent harmful shocks to the mechanism and also to prevent disarrangement of the garment being ironed or pressed by the air current caused by the too rapid displacement of the air between the pressing head and the buck at the moment the pressing head moves into close proximity to the buck, the excessive power absorbed by the dash pots, brakes or overbalancing means representing waste of power.

Objects of our invention, therefore are to provide a mechanism for transmitting and transforming force, comprising levers and links so selected and adjusted as to overcome these objections to prior art structures and to supplementally provide a device which will function to fulfill all the requisites desired in a mechanism of this type.

A further object of our invention is to provide a device which will transform the input force into the necessary amount of output force desired for optimum operating conditions at various stages of the operation of the press to obtain maximum efficiency from the input force without the loss of any mechanical work lost in prior art structures by the various types of braking mechanisms formerly thought necessary.

It is apparent that during the closing of the press, to avoid injury, it is desirable to apply as light a force as possible to the pressing head, and it is also apparent for the sake of efficiency that it is desirable to have the movement of the pressing head as rapid as possible during said closing period. As stated hitherto, it is also desirable that the velocity of the movement of the pressing head be as rapid as possible during as much of its closing period as possible, but that its relative velocity when it contacts the buck should be reduced to that at which it can safely contact the buck without disarrangement of the garment being pressed, and thus, through the medium of the selection of the leverage employed during the closing period and its method of connection and manner of being guided, we are able to achieve all these results in the closing period of the pressing head. By picking out an arrangement suitable for this purpose, it is possible to control the velocity of the pressing head without the necessity of employing any braking means of the types formerly used, to impair the speed and efficiency of the linkage mechanism.

As stated, it is also desirable during the force applying period to have the pressing force applied to the garment being pressed as large as is consistently possible, but above all to secure an even pressing action for optimum pressing efficiency to have it constant during the pressing period. By the selection and arrangement of a leverage having a characteristic suitable to achieve these results during the pressing period, we are able to accomplish these desirable results.

As stated hitherto, it is desirable to close the press as rapidly as possible with as little force as possible and it is also desirable that the effective leverage characteristics acting upon the pressing head during the pressing period, namely the application of a greater pressing force, take effect as rapidly as possible once the head has contacted the buck. By providing a short transmutation period in changing from one effective leverage to the other, we are able to speed up the transition between these two periods without impairing the efficiency of the pressing operation during either period. As shown in the diagrams, and as will be apparent, in the parlance of motion pictures, during this transmutation period, the characteristics of the first leverage "fade out" and the characteristics of the second leverage "fade in." This result is highly desirable as it results, even during this extremely short transmutation period, in a rapid increase of force applied by the pressing head to cause it to immediately start to function in its pressing operation with desirable efficiency at the instant the head contacts the buck. It is also obvious that the press closes rapidly in a desirable manner almost to the moment it contacts the buck due to the rapidity of this short transmutation period, the transmutation of movement from fast to slow motion taking place rapidly during said period.

A further object of our invention is to provide a linkage system which will function in accordance with a predetermined movement curve, a predetermined force or multiplication factor of leverage curve and/or a predetermined relative velocity curve. It is apparent that by providing a device which will function in accordance with these respective curves we are able to design a theoretical device which will function with optimum efficiency in accordance with a theoretical curve and actually construct a device in accordance with said curve and continuously reproduce identical device. In the manufacture of the linkages the trial and error method is usually employed. When a trial device is assembled, its respective curves may be plotted or otherwise constructed and corrected until the device functions in accordance with the desired theoretical curve.

As stated, we are able to achieve all these desirable results through the proper selection, connection and manipulation of two or more levers and suitable connecting links.

A further object of our invention is to employ rigid links as interconnecting means, and in order that a smaller plurality of rigid links may be employed, we preferably employ links having transmutable functions in certain embodiments shown herein functioning prior to the transmutation of leverage characteristics as either fulcrums or guides and vice versa after the transmutation of the leverage characteristics, and in other embodiments functioning alternately as power transmitting means and guides or fulcrums respectively before and after the transmutation of the leverage characteristics. It is apparent that by making the same links perform different functions during the actuation of the mechanism we are able to cut down the number of inherent parts necessary for the successful operation of our invention.

It is apparent that whether one or more levers be employed mounted on floating or fixed pivots, at least certain of the links must be mounted on certain definite fixed pivots, and a further object of our invention is to provide a device wherein the linkage may be changed, as is necessary in employing a different type of head requiring less force in the pressing operation and still have it mounted on the same fixed pivots.

A further object of our invention is that we are able to provide a device from which varying leverages may be successively obtained from a minimum number of parts easily assembled in a small compass to make them readily attachable on the relatively small space available on a garment pressing machine.

A further object of our invention is to provide a mechanism having low frictional loss.

A further object of our invention is to provide a device as will be apparent from the curve having an increasing movement during the pressing operation, as called in the trade a "follow up" motion, so that as the padding wears down in use it will still function with the same pressure without readjustment or replacement.

We are aware that somewhat analogous results have been provided in the prior art by the use of cam structures. As stated hitherto, our improved mechanism consists solely of power applying lever means and rigid links pivotally connected at single points and controlled in their movement. It is apparent that the types of levers and links required are easier to make than to cut a suitable cam. It is also apparent that due to the fact that they are pivotally connected together by single point connections spread over a plurality of surfaces they wear less than a single cam and achieve an analogous purpose. It is also apparent that after a considerable amount of use and distributed wear, their force transforming and leverage characteristics are retained, whereas with all the wear on a single irregular cam surface they are not. It is also apparent that changes in effective transformation of force can be made by merely changing the points of connection of the levers and links without having to totally discard a member or any portion thereof, as is necessary in cams. It is also apparent that in employing simple levers and links it is possible to obtain a rapid transmutation period on devices which will function in the desired manner without excessive strain or wear thereon; whereas to obtain the same result in a cam, an extremely irregular cam having a sharp point is required, which not only is noisy in its operation and tends to strain the various parts in use, but also is subject to extensive wear in use.

A further object of the embodiments of our invention shown herein is to eliminate the interconnecting links which function solely as guide links or alternate guide links and fulcrum providing means by making every possible link transmutable in its function from a fulcrum providing or guide link to a transmutable power transmitting link, making every link perform this function.

A further object of the embodiments of our invention shown is to construct our improved linkage mechanism so that one lever may function as a booster lever to function after the other lever.

These and such other objects of our invention as may hereinafter appear will be best understood from a description of the embodiment thereof shown in the accompanying drawings.

Figure 5:
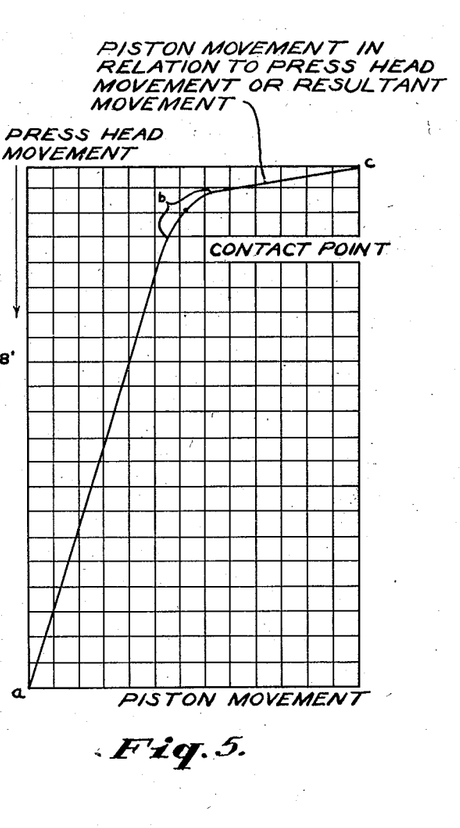
Fig. 5 illustrates a graph or chart showing the curve provided by the embodiment of our invention shown in Figs. 1-3 employing the amount of piston movement as abscissa and the amount of pressing head movement as ordinates.

In the drawings, wherein like characters of reference generally indicate like parts throughout, 20 generally indicates a mechanism for transmitting and transforming force constructed in accordance with our invention. As stated hitherto, the specific type of such mechanisms shown is particularly designed and adapted for use to solve the problems inherent in a garment pressing machine, said mechanism being specifically designed to function in accordance with the curves shown in Fig. 6, the mechanism shown in Figs. 1-3 having a movement curve slightly varying therefrom as shown in Fig. 5.

Figure 1:
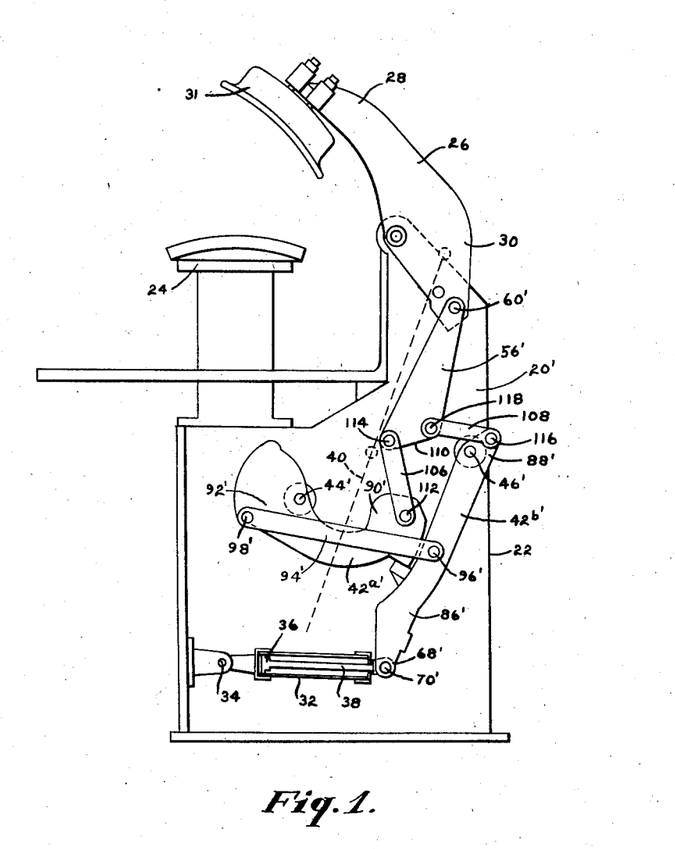
Figs. 1-3 are side elevations of a garment pressing machine constructed in accordance with our invention, Fig. 1 showing the garment pressing machine in open position, Fig. 2 showing the garment pressing machine in the initiation of the transmutation period showing the pressing head about to contact the buck and Fig. 3 showing the pressing machine closed in pressing position.
Figure 3:
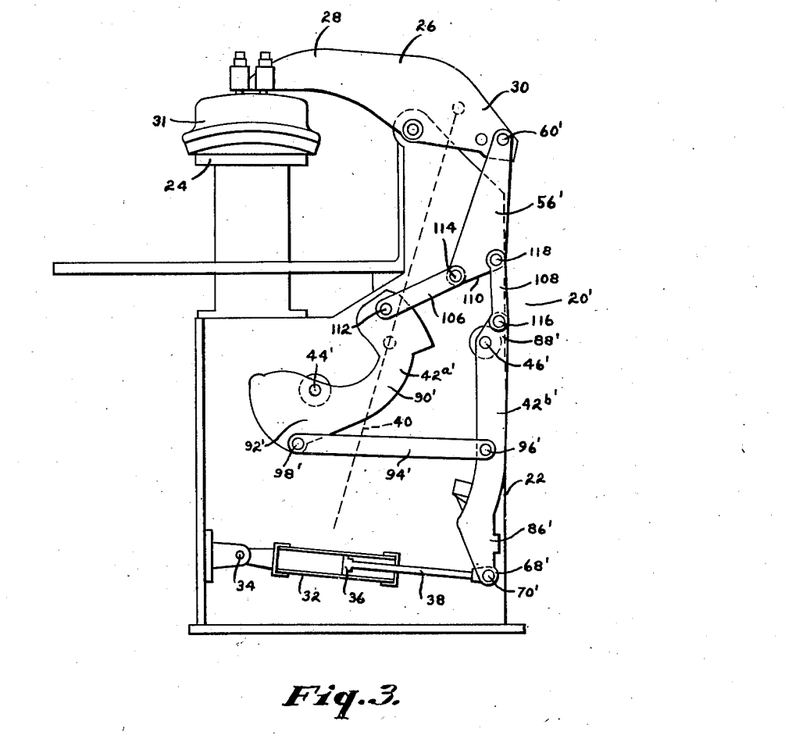

Any suitable type of a power driven garment pressing machine may be employed. As shown in the drawings, such a standard type of garment pressing machine includes a frame 22, a pressing buck 24 mounted on said frame, a pressing lever 26 pivotally mounted on said frame having a work arm 28 and a power arm 30 and a pressing head 31 mounted on said work arm to move to a closed position into pressing contact with said buck 24, as shown in Fig. 3, and to an open position away therefrom, as shown in Fig. 1. As the motive force for the power press, a suitable fluid motor is preferably employed comprising a cylinder 32 pivotally mounted as at 34 on said frame 22 having a piston 36 having a piston rod 38 projecting outwardly therefrom. Suitable means are provided to urge said pressing lever to an open position, in the embodiments shown, comprising the compression spring 40 suitably operatively connected to said power arm 30.

Figure 6:
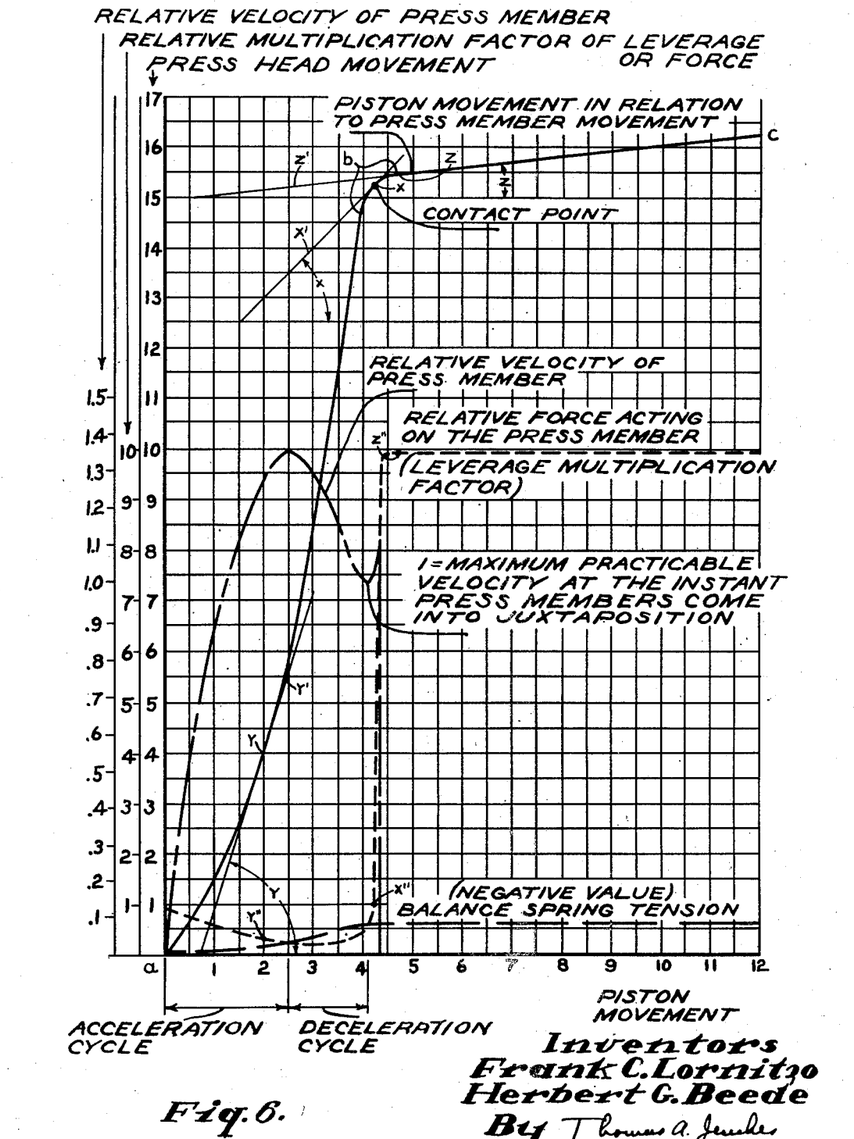
Fig. 6 is a composite graph illustrating the motion curve in full lines, the force or multiplication factor of leverage curve in dotted lines, the relative velocity curve in dot-dash lines and the balance spring tension curve in dash lines.

As stated hitherto, we employ mechanism 20 connecting said piston rod 38 and said pressing lever power arm 30, consisting solely of a plurality of power applying lever means, in the embodiment shown two, comprising the closing period power applying levers 42$^a$ and the pressing period power applying lever 42$^b$ and rigid links so pivotally interconnected by single point connections and controlled in their movement to respectively transmit to said pressing head 31 the even force supplied by the even stroke of the piston 36 against the force of said urging means 40 while actuating said pressing lever 26, while transforming it into the following, as illustrated by the curves shown in Fig. 6, namely into (a) a relatively extremely light force applied to said pressing head 31 during its closing period and a relatively extremely heavy substantially constant force applied to said pressing head 31 during its pressing period after an extremely short intermediate rapid force increasing transmutation period, in the course of which said pressing head 31 contacts said buck 24, as illustrated by the curve shown in full lines in Fig. 6; (b) also transforming said even force to cause an extremely rapid relative movement of said pressing head 31 during its closing period and a relatively slow movement of said pressing head 31 during its pressing period after said extremely short intermediate transmutation period, as illustrated by the dotted line curve shown in Fig. 6; and (c) also transforming said even force to cause during said closing period an initial sharp increase in the relative velocity of movement of the pressing head 31 and a substantial drop in the relative velocity of said movement of the pressing head 31 to a velocity at which it can safely contact the buck 24 without disarrangement of the garment being pressed just prior to contact with the buck 24, as shown by the dash-dot line curve in Fig. 6. As will be apparent from said respective curves, the dotted line curve shown therein represents the ratio of force exerted by the piston to the force exerted by the pressing head, which, as shown by said dotted line curve varies in accordance with our invention in accordance with said curve in which the relative ratio of force exerted by the pressing head 31 to the force exerted by the piston 36 is less than 1 during the press closing period, increases multi-fold during an extremely short transmutation period in the course of which said pressing head 31 contacts said buck 24 and remains substantially constant at said high ratio during the pressing period. As also shown by the full line curve in Fig. 6, the ratio of piston movement varies in accordance with said curve wherein the relative ratio of the movement of the pressing head 31 to the movement of the piston 36 is substantially greater than 1 during the press closing period and after said extremely short transmutation period in the course of which said pressing head contacts said buck, remains substantially constant during the pressing period. As also shown by the dash-dot curve shown in Fig. 6, the ratio of the velocity of the pressing head movement also varies in accordance with said dotted line curve shown therein in the manner previously explained. We believe we are the first, therefore, to cause these respective ratios to vary during said respective periods for a linkage system employing two separate levers in accordance with predetermined designs or plotted theoretical curves.

Figure 7:
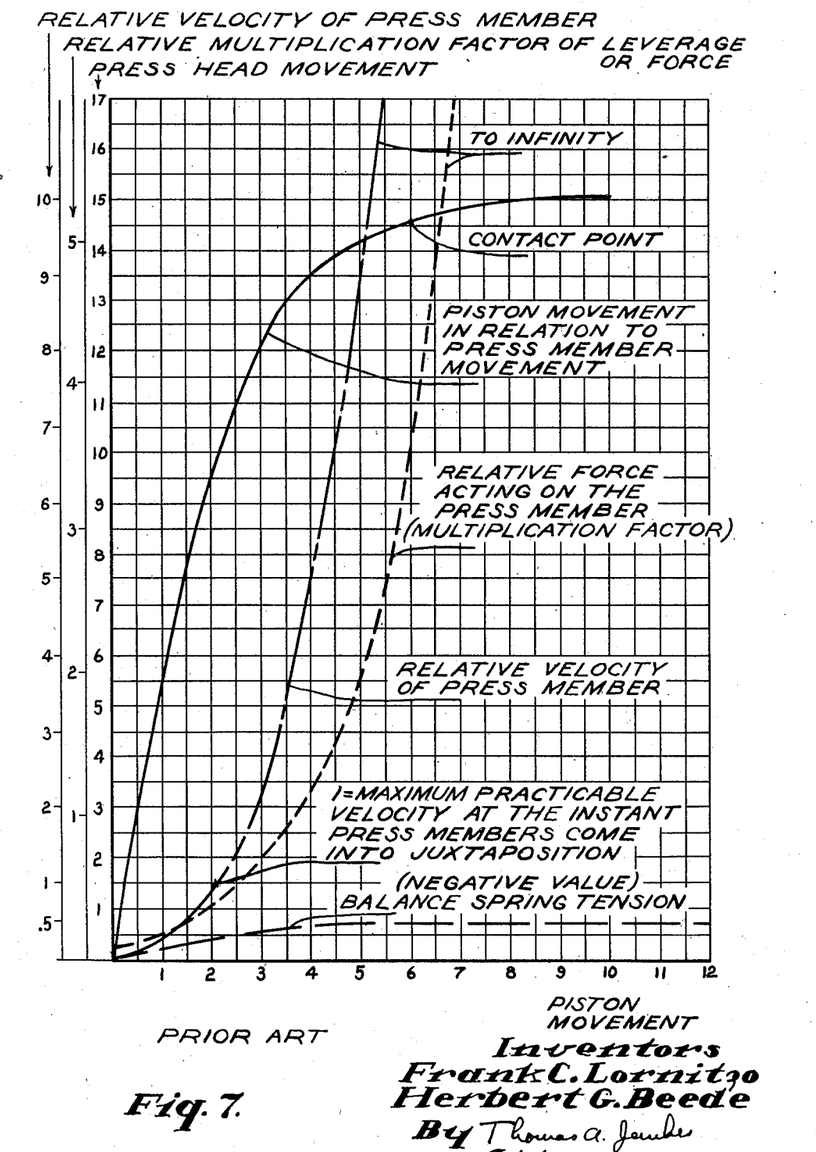
Fig. 7 is a composite graph showing the motion curve in full lines, the force of multiplication factor of leverage curve in dotted lines, the relative velocity curve in dot-dash lines and the balance spring tension curve in dash lines of typical prior art transmitting and transforming linkage systems for the same purpose.

It is a principal of the mechanics of leverage systems that the product of any movement and applied force is equal to the product of any other movement and applied force, in other words that at any instant the input force supplied to the piston times the movement of the piston equals the output force supplied by the pressing head times the movement of the pressing head. This relationship can be expressed by a graph if either the relative movements of the piston and the pressing head or relative forces applied by the piston and pressing head be plotted. Thus to get the corresponding movement or force at any one instant, it is merely necessary to draw the tangent to the movement curve at that particular point, and the co-tangent of the angle formed by the extension of said tangent and the abscissa or any line parallel thereto or the angle of slope of the movement curve at said point represents and indicates the corresponding point in the force curve or vice versa, and thus having once plotted the relative movement or the relative force curve, the corresponding curve can be figured through the medium of the respective co-tangents. It is also apparent that once the relative multiplication factor of leverage or force curve is obtained, the relative velocity of press member curve may be readily obtained therefrom for any particular period by plotting the acceleration or de-acceleration of velocity of the press member at different successive periods as evidenced by the plotted force curve. Thus if either the movement curve, the force curve or the relative velocity curve can be theoretically predeterminedly designed or plotted or measured, the other corresponding curves may be readily figured therefrom. The movement curve may be readily obtained by moving the linkage mechanism a desired unit amount and actually measuring the relative input and output movements and plotting its respective point and repeatedly moving the linkage mechanisms additive amounts, preferably multiple amounts of the previous movement, and measuring and plotting those respective points until the desired movement curve as shown in Fig. 6 is made up. Assuming that the movement curve has been constructed or recorded in accordance with said method or otherwise, as shown in Fig. 6, if the tangent to said curve be drawn at any one point, such as the contact point $x$, as evidenced by the tangent $x'$, the co-tangent of the angle $x$ formed by the extension of said tangent and the abscissa or any line parallel to the abscissa will give the proper value from which the complementary point in the force curve may be plotted. Inasmuch as the angle at the point $x$ is 45°, it is apparent that its co-tangent will be 1, namely the contact point $x''$ shown in the force curve. We have also illustrated in the drawings how the complementary point $y''$ in the force curve may be figured from the corresponding point $y$ in the movement curve. The tangent $y'$ to the movement curve at the point $y$ carried down to the abscissa produces the angle $y$ shown. The co-tangent of this angle is less than one-half as indicated by the complementary point $y''$ on the force curve. We have also illustrated in the drawings how the corresponding point $z''$ in the force curve may be figured from the corresponding point $z$ in the movement curve, in this instance being the point $z$ at the termination of the curve $b$ representing the short transmutation period. In this instance the tangent $z'$ to the movement curve at the point $z$ carried down to the abscissa produces the angle $z$ shown, and in the curve shown in Fig. 6, coincides with the relative straight oblique line of movement $bc$ of the movement curve shown in full lines. The co-tangent of the angle $z$ is substantially 10, as indicated by the corresponding point $z''$ on the force curve. Inasmuch as the angle $z$, therefore, remains constant for any point in the straight line $bc$, it is obvious that its corresponding point figured from its co-tangent will be in alignment with the corresponding point in the force curve figured from the co-tangent to form a straight line in the force curve as shown therein substantially beyond said point $z''$, graphically bringing out the fact that the pressing head acts with even force during the pressing period. By similarly plotting a sufficient number of points on the force curve, the force curve may be readily figured. Insofar as the relative velocity of the press member curve is concerned, it is obvious that if the force acting on the press member is maintained constant during the closing period, said velocity would increase in a substantially straight line extending upwards from zero at a slight angle as substantially a continuation of the straight line shown up to the unit 1. As shown by the force curve, however, the acceleration of force decreases substantially up to the contact point, causing the relative velocity curve to correspondingly decrease, as shown up to a point substantially midway where the force of the balance spring tension hereinafter described reduces the relative velocity of the press member so that it can safely contact the buck without disarrangement of the garment being pressed. If, however, either the relative velocity or the relative force curves are initially designed, figured or plotted first, it is apparent that the corresponding curves may be readily figured or plotted therefrom. For the curves shown in Fig. 6, in making up the movement curve, the same units of movement are applied for ordinates and abscissa; in making up the relative multiplication factor of leverage or force curve, the same units of force are applied for ordinates and abscissa. In making up the relative velocity of press member curve, however, the abscissa units represent fractions of the time interval of total piston travel, whereas the ordinate units comprise the maximum practical velocity of the pressing head the instant the press members come into juxtaposition taken as 1 (in this instance not corresponding to the regular ordinate divisional lines). For the curves shown in Fig. 7, however, in making up the movement curve, the same units of movement are also applied for ordinates and abscissa; in making up the relative multiplication factor of leverage curve, however, the ordinate units are exaggerated relative to the abscissa units to more accurately represent the curve and in making up the relative velocity of press member curve, the velocity unit scale for making up the ordinates thereof is reduced in length from the units shown in Fig. 6, still, however, employing the maximum practical velocity of the pressing head at the instant the press members come into juxtaposition as 1. Slightly different scales are employed in Fig. 5. We have shown in Fig. 7, that such respective curves were made by typical linkages employed for this purpose in the prior art without any braking mechanisms. As shown in full lines in Fig. 7, the movement curve also shown therein in full lines decreases rapidly up to the contact point, thereby increasing the time interval required for closing the press. As shown by the force curve or the multiplication factor of leverage curve also shown in dotted lines and by the relative velocity of the pressing head curve also shown in dash-dot lines, both the force and relative velocity of force tend to increase to infinity. It therefore is absolutely essential to employ braking mechanisms on the prior art structures. For convenience we have also indicated the maximum practical velocity at the instant the press members come into juxtaposition, illustrating with what loss of efficiency said structures had to be braked. An inspection of the dotted line curve shown in Fig. 6, however, will demonstrate that the relative multiplication factor of leverage or force curve provided by our invention is very small right up to the contact point of the head with the buck, the condition desirable for safety during the press closing period, then increases rapidly during the transmutation period and then remains substantially constant during the pressing period for optimum even pressing during the pressing period. We have also shown in the drawings in dash lines the balance spring tension curve which is substantially the same in both the prior art devices and our invention. In Fig. 6, however, one factor is extremely interesting, namely that when the closing period nears its completion, the effective force of the pressing head becomes temporarily less than the tension of the balance spring so as to cause a positive slowing down of the relative velocity of the press member, as shown by the dot-dash line, to have it travel substantially at the instant the pressing head 31 contacts the buck 24 at a velocity insufficient to disarrange the garment being pressed.

As stated hitherto, our improved force transmitting and transforming mechanism 20' preferably includes power applying lever means 42a' and 42b' pivotable substantially entirely on one lowering movement fulcrum 44' for the lever 42a' to apply a rapid movement and a small force to said pressing head during the closing period and the lever 42b' pivotable substantially entirely on another power applying fulcrum 46' to also apply a slow movement and a large force to said pressing head during the pressing period and rigid link means for automatically rapidly transmuting the leverage characteristics of said lever means by rapidly changing the effective respective power transmitting fulcrums 44' and 46' of said respective levers 42a' and 42b' after a predetermined pivotable movement thereof to cause the rapid transmutation period during which the force applied to the pressing head increases rapidly as hitherto described. As shown by the curve in full lines in Fig. 6, the transmutation period comprises substantially the length of the sharply curved portion b, whereas the substantially straight line portion ab of the curve in front of said transmutation period illustrates the movement during the closing period and the substantially straight line portion bc of said curve after said curved portion b illustrates the movement during the pressing period, the length of said sharply curved portion b defining the transmutation period in the other force and relative velocity curves shown therein. It will be observed that the point x marked "contact point" is made substantially half way of said curve, illustrating that the head contacts the buck in the latter half of this rapid transmutation period. Looking at the matter another way, during the closing period the power applying lever 42a' has one type of effective leverage characteristics and during the pressing period the lever 42b' has a different type of leverage characteristics.

As will be apparent from said application of Frank C. Lornitzo aforesaid, where two separate levers are employed they may be so connected up in accordance with said invention to produce substantially identical curves as those shown therein. In the embodiments shown in this application, one power applying lever 42a' functions as a lever of a certain class having a certain type of lever characteristics to apply a rapid movement and a light force to said pressing head 31 while pivoting on a single effective closing movement fulcrum pin 44', and the other power applying lever 42b' successively functions as a lever having an entirely different type of leverage characteristic, often as a lever of a different class to apply a slow movement and a large force to said pressing head while pivoting on a single different power applying pressing movement fulcrum pin 46', during a single outward stroke of the piston 36.

Figure 2:
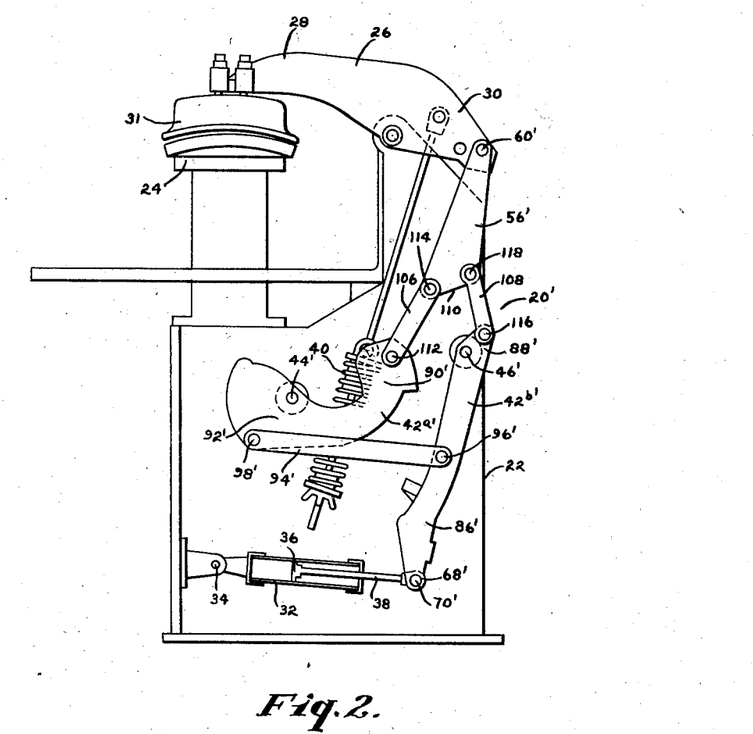

We have shown in Figs. 1-3 an embodiment of our invention wherein the upper toggle link 56' is made of triangular shape having separate power transmitting links 106 and 108 respectively connecting the small force applying lever 42a' to the front end of the base thereof and the large force applying booster lever 42b' to the rear end of the base thereof. In this embodiment, however, unquestionably each respective power applying link 94', 106 and 108 alternately transmutably function as power applying links and as guide links respectively, the link 94' transmutably functioning as a power applying link during the closing period and as a guide link during the pressing period, the power applying link 106 transmutably functioning as a power transmitting link during the closing period and alternately functioning both as a guide and as a fulcrum providing link during the pressing period, and the link 108 transmutably functioning as a power applying link during the pressing period and as a combination fulcrum and guide link during the closing period. The booster power applying lever 42b' functions both as a power transmitting lever and guide during the closing period and as a power applying lever during the pressing period. The booster power applying lever of the first class 42b' is mounted on a fixed pivot point on the frame by the fixed pivot pin 46'. Said booster power applying lever of the first class 42b' is effective to apply a slow movement and a large force to said pressing head 31 and has the end of the piston rod 38 pivotally connected at a single point 68' adjacent the end of the long arm thereof by the pivot pin 70'. Said lever 42b' has a long arm 86' and a short arm 88'. The second power applying lever of the first class, namely the lever 42a' also has the short arm 92' and the long arm 90' and is pivotable on a single fixed pivot on the frame by means of the fixed pivot pin 44'. Said power applying lever 42a' is effective to apply a rapid movement and a small force to said pressing head. The link 94' is also pivotally connected to a fixed point on the long arm 86' of said booster lever 42b' by the pivot pin 96' and to a fixed point on the short arm 92' of said second lever 42a' by the pivot pin 98'. The upper toggle link 56' comprises a triangular member, which may also be considered as a floating power applying lever, having a base 110 and having the apex thereof pivotally connected to a single point on the pressing lever power arm by the pivot pin 60'. The small force of the lever 42a' is transmitted to said triangular upper link member or floating power applying lever 56' by the power transmitting link 106 pivotally mounted on a point adjacent the end of the long arm 90' of the lever 42a' by the pivot pin 112, and to a fixed point on the front end of the base 110 of the upper toggle link 56' by the pivot pin 114. The power transmitting link 108 is also pivotally connected to a fixed point on the short arm 88' of said booster power applying lever 42b' by the pivot pin 116 and to a fixed point on the rear end of the base 110 of said triangular upper link or floating power applying lever 56' by the pivot pin 118.

In this embodiment, power is applied to the end of the long arm 86' of the power applying lever 42b' by medium of the piston rod 38. This in turn initially actuates the connecting link 94' to rotate the lever 42a' to cause it to function as a lever of the first class to raise the front end of the base 110 of the triangular upper link or floating power applying lever 56' through the medium of the power transmitting link 106 to the position shown in Fig. 2, for this purpose tilting said upper toggle link 56' rearwards. During this period the power transmitting link 108 functions as the fulcrum for the pivoting movement of the upper toggle link 56' and as a guide for it. Then there occurs a short transmutation period during which the actions of the respective power transmitting levers are somewhat merged into each other to cause a rapid force increasing transmutation period. As the power arm 86' of the lever 42b' is further urged outwardly by the piston rod 38, it is obvious that its short arm 88' then functions to transmit power through the medium of the power transmitting link 108 to urge the upper toggle link or floating power applying lever 56' upwards to apply power in a manner substantially at right angles to the application of the power applied by the power transmitting lever 42a' during the pressing period. During this period the lever 42a' and the links 94' and 106 function respectively as guide means for the upper toggle link 56' and the transmutable link 106 supplementally functions as a pivot point for the upward pivotal movement of the upper toggle link 56' caused by power transmitted from the short arm 88' of the power applying lever 42b' through the medium of the power transmitting link 108.

It is obvious that the effective leverage of the mechanisms 20' may be readily changed by changing the sizes and shapes of the respective levers and links and their respective points of connection to the piston rod, pressing lever and to each other. The power applying levers and the respective guide, fulcrum providing and/or power transmitting links are so constructed and connected respectively to each other and to said pressing levers and piston rod, and the movement permitted by said levers and links is such that the device will cause the force transmitted by the piston rod to be transmitted and translated into force, movement and velocity applied to the pressing head in accordance with the curves shown in Fig. 6. An inherent feature of our invention consists of the fact that all connections between the various members are pivot forming single point connections.

Figure 4:
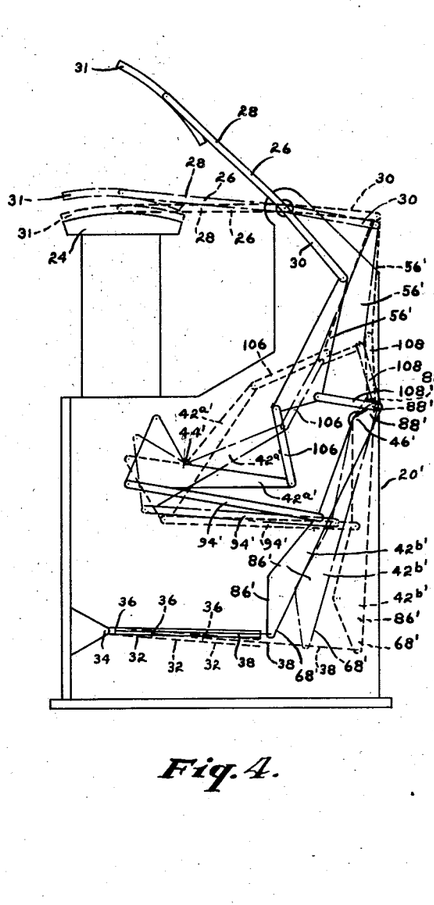
Fig. 4 is a diagrammatic view illustrating component parts of the press and linkage shown in Figs. 1-3, showing the press in open position in full lines, in the intermediate position in dot-dash lines and in closed position in dotted lines.

We have shown in Fig. 4 diagrammatic views illustrating the three positions of the embodiment shown in Figs. 1–3. In order that the transition of the transmutable functioning characteristics of the levers 42a' and the levers 42b' and links may be more readily understood, we have also shown in Fig. 5, the characteristic curves of this embodiment, which differs slightly from the preferred curve shown in Fig. 6 which is a composite curve made up of the most desirable characteristics of the embodiment shown in Figs. 1–3, and of the embodiments shown in said Lornitzo application aforesaid. One reason why these curves differ slightly from the different types of linkages employed is that in each instance it is desirable first to secure a straight line increment of movement supplied during the press closing period and a substantially constant slightly increasing straight line increment of movement supplied during the pressing period for the reasons hitherto advanced. It is apparent from an inspection of Fig. 4, and the corresponding figures in said Lornitzo application that all respective movements of controlling portions of the levers and linkages are curvilinear, and in order to obtain these straight line movements aforesaid, a curvilinear movement in one direction must generally be balanced by a curvilinear movement in the opposite direction, and these counterbalancing movements in order to obtain straight line increment portions in the respective curves must be counterbalanced, and it is apparent that the desired curve is obtained by a nice empirical balancing of the respective curvilinear movements of the respective elements in the different embodiments shown. It is apparent, however, from an inspection of Fig. 5, and the corresponding graphs in the Lornitzo application aforesaid that all of these graphs or curves are substantially similar to the ideal graphs or curves shown in Fig. 6. As stated, the number, size, shape and location of the single point connections for the various levers and links shown in this application and in said Lornitzo application may be computed mathematically.

It is understood that our invention is not limited to the specific embodiment shown and that various deviations may be made therefrom without departing from the spirit and scope of the appended claims.

What we claim is:

1. In a garment pressing machine, a frame, a pressing buck mounted on said frame, a pressing lever of the first class pivotally mounted on said frame, a pressing head mounted on said pressing lever to move to a closed position into pressing contact with said buck and to an open position away therefrom, motor means for actuating said pressing lever, means urging said pressing lever to an open position, a booster power applying lever of the first class comprising a lower toggle link having a long arm and a short arm, pivotable on a single fixed pivot on said frame, effective to apply a slow movement and a large force to said pressing head having said motor means pivotally connected at a single point adjacent the end of the long arm thereof, a second power applying lever of the first class having a long arm and a short arm pivotable on a single fixed pivot on said frame, effective to apply a rapid movement and a small force to said pressing head, a link pivotally connecting a fixed point on the long arm of said first lever to a fixed point on the short arm of said second lever, a triangular member comprising an upper toggle link having the apex thereof pivotally connected to a single point on said pressing lever, a power transmitting link pivotally connecting a fixed point on the long arm of said second lever to a fixed point on the front end of the base of said triangular upper toggle link and a power transmitting link pivotally connecting a fixed point on the short arm of said first lever to a fixed point on the rear end of the base of said triangular upper link, said levers and interconnecting link means being so constructed, connected and guided as to transmit to said pressing head the substantially even force supplied by said motor means against the force of said urging means while actuating said pressing lever, while transforming it into a relatively extremely light force applied to said pressing head during its closing period and a relatively extremely heavy substantially constant force applied to said pressing head during its pressing period after an extremely short intermediate rapid force increasing effective leverage changing transmutation period during which said pressing head contacts said buck; and also transforming said even force to cause an extremely rapid relative movement of said pressing head during its closing period and a relatively slow movement of said pressing head during its pressing period after said extremely short intermediate effective fulcrum changing transmutation period.

2. In a garment pressing machine, a frame, a pressing buck mounted on said frame, a pressing lever of the first class pivotally mounted on said frame, a pressing head mounted on said pressing lever to move to a closed position into pressing contact with said buck and to an open position away therefrom, motor means having a piston for actuating said pressing lever, means urging said pressing lever to an open position, a power applying lever pivotable on a fixed pivot, initially effective to apply a rapid movement and a small force to said pressing head, a second power applying lever pivotable on a fixed pivot, successively effective to apply a slow movement and a large force to said pressing head, one of said power applying levers being connected to the piston by a single point connection to be actuated thereby, a link pivotally connecting fixed points on said levers together, power transmitting means pivotally connected to the pressing lever and a pair of transmutable links each pivotally connected to a point on said power transmitting means spaced from the point of connection of said other link and one pivotally connected to a fixed point on said large force applying lever to act as the fulcrum for the power transmitting means during the effective actuation of said first power applying lever, and the other pivotally connected to a fixed point on said small force applying lever to act as the fulcrum for the power transmitting means during the effective actuation of said second power applying lever, said links also then respectively functioning as guide means for said power transmitting means, each of said links when not functioning as fulcrum providing means alternatively functioning respectively to transmit power from their respective levers, said levers, power transmitting means and link means being so constructed, connected and guided as to transmit to said pressing head the substantially even force supplied by said motor means against the force of said urging means while actuating said pressing lever, while transforming it into a relatively extremely light force applied to said pressing head during its closing period and a relatively extremely heavy substantially constant force applied to said pressing head during its pressing period after an extremely short intermediate rapid force increasing effective leverage changing transmutation period during which said pressing head contacts said buck; and also transforming said even force to cause an extremely rapid relative movement of said pressing head during its closing period and a relatively slow movement of said pressing head during its pressing period after said extremely short intermediate effective fulcrum changing transmutation period.

FRANK C. LORNITZO.
HERBERT G. BEEDE.

REFERENCES CITED

The following references are of record in the file of this patent:

UNITED STATES PATENTS

| Number | Name | Date |
|---|---|---|
| 368,347 | Massey | Aug. 16, 1887 |
| 1,633,260 | Ledbetter | June 21, 1927 |
| 1,653,192 | Stocker et al. | Dec. 20, 1927 |
| 1,680,729 | Davis | Aug. 14, 1928 |
| 1,747,879 | Pauly | Feb. 18, 1930 |
| 1,800,680 | Davis | Apr. 14, 1931 |
| 1,820,051 | Davis | Aug. 25, 1931 |
| 1,822,613 | Clarke | Sept. 8, 1931 |
| 1,837,018 | Davis | Dec. 15, 1931 |
| 1,912,778 | La Brie | June 6, 1933 |
| 1,934,392 | Wardell | Nov. 7, 1933 |
| 2,026,264 | Beede | Dec. 31, 1935 |
| 2,190,972 | Boldt | Feb. 20, 1940 |
| 2,250,715 | Lauer et al. | July 29, 1941 |

FOREIGN PATENTS

| Number | Country | Date |
|---|---|---|
| 503,839 | Great Britain | Apr. 11, 1939 |
| 504,727 | Great Britain | Apr. 28, 1939 |